United States Patent
Li et al.

(10) Patent No.: US 11,269,971 B2
(45) Date of Patent: Mar. 8, 2022

(54) PROVIDING READING INSIGHT ON URLS WITH UNFAMILIAR CONTENT

(71) Applicant: International Business Machines Corporation, Armonk, NY (US)

(72) Inventors: Jenny S. Li, Cary, NC (US); Yu Deng, Yorktown Heights, NY (US); Al Chakra, Apex, NC (US); Theresa Tai, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/785,717

(22) Filed: Feb. 10, 2020

(65) Prior Publication Data

US 2021/0248203 A1    Aug. 12, 2021

(51) Int. Cl.
*G06F 16/955* (2019.01)
*G06F 9/54* (2006.01)
*G06F 9/445* (2018.01)
*G06F 9/38* (2018.01)
*G06N 20/00* (2019.01)

(52) U.S. Cl.
CPC ........ *G06F 16/9566* (2019.01); *G06F 9/3802* (2013.01); *G06F 9/4451* (2013.01); *G06F 9/542* (2013.01); *G06F 9/547* (2013.01); *G06N 20/00* (2019.01)

(58) Field of Classification Search
CPC ......... H04L 67/06; H04L 67/02; G06F 9/451; G06F 16/168; G06F 3/0484
See application file for complete search history.

(56) References Cited

U.S. PATENT DOCUMENTS

| | | |
|---|---|---|
| 8,078,625 B1 | 12/2011 | Zhang et al. |
| 8,447,837 B2 | 5/2013 | Devanneaux et al. |
| 9,058,396 B2* | 6/2015 | Kim ................ G06F 16/954 |
| 10,331,769 B1 | 6/2019 | Hill et al. |
| 10,706,450 B1* | 7/2020 | Tavernier ......... G06F 16/9535 |

(Continued)

FOREIGN PATENT DOCUMENTS

CN       104468720 A       3/2015

OTHER PUBLICATIONS

"How do I read the Legacy Accountability Report?", CovenantEyes, Printed Nov. 21, 2019, 10 pages, <https://www.covenanteyes.com/support-articles/read-legacy-accountability-report/>.

(Continued)

*Primary Examiner* — Abdullahi E Salad
(74) *Attorney, Agent, or Firm* — Sonny Z. Zhan

(57) ABSTRACT

In an approach for providing reading insight and notification on a URL with unfamiliar content for a user, a processor parses a web page to identify a URL. The URL references a subsequent web page. Prior to receiving a user interaction with the URL, a processor prefetches content of the subsequent web page. A processor determines a content domain of the prefetched content, the content domain being a summary of the prefetched content. A processor compares the content domain to a user profile, wherein the use profile is based, at least in part, on a browsing history of a user. A processor determines that the content domain is not in alignment to the user profile. A processor presents a notification to the user.

6 Claims, 4 Drawing Sheets

(56) References Cited

U.S. PATENT DOCUMENTS

| | | | |
|---|---|---|---|
| 2005/0044242 A1* | 2/2005 | Stevens | H04L 69/329 709/228 |
| 2006/0085476 A1* | 4/2006 | Daniels | G06F 16/951 |
| 2013/0193201 A1* | 8/2013 | Bradley | G06Q 30/0623 235/375 |
| 2014/0025949 A1* | 1/2014 | Kay | G06F 21/44 713/168 |
| 2014/0164447 A1* | 6/2014 | Tarafdar | G06F 16/182 707/827 |
| 2015/0088879 A1* | 3/2015 | McFadden | G06F 16/9535 707/736 |
| 2015/0271202 A1* | 9/2015 | Yan | H04L 63/1408 726/23 |
| 2015/0365465 A1* | 12/2015 | Devanneaux | H04L 69/16 709/217 |
| 2016/0072721 A1* | 3/2016 | Hill | H04L 41/0823 709/226 |
| 2016/0255535 A1* | 9/2016 | De Foy | H04L 67/2847 370/236 |
| 2017/0031894 A1* | 2/2017 | Bettersworth | G06N 20/00 |
| 2017/0193119 A1* | 7/2017 | Unni | G06F 16/9535 |
| 2018/0025503 A1* | 1/2018 | Tsai | G06K 9/00483 382/100 |
| 2018/0032877 A1 | 2/2018 | Jain et al. | |
| 2018/0091578 A1* | 3/2018 | Bendell | G06F 16/957 |
| 2018/0246862 A1 | 8/2018 | Burkard et al. | |
| 2018/0246983 A1* | 8/2018 | Rathod | G06F 16/9535 |
| 2018/0314762 A1* | 11/2018 | Rathod | G06F 16/9566 |
| 2018/0337972 A1* | 11/2018 | Lepeska | H04L 67/2814 |
| 2018/0351931 A1* | 12/2018 | Shull | H04L 63/08 |
| 2020/0004889 A1* | 1/2020 | Mathur | G06F 16/9574 |
| 2020/0134092 A1* | 4/2020 | Yanosy, Jr. | G06F 16/86 |
| 2020/0213379 A1* | 7/2020 | Ramachandra Iyer | G06F 16/285 |

OTHER PUBLICATIONS

Saranya.S et al., "WarningBird Mail Alert Based Malicious URLs Blocker System in Twitter", International Journal of Computer Science and Mobile Computing, vol. 3, Issue 1, Jan. 2014, pp. 69-74.

* cited by examiner

PROVIDING READING INSIGHT ON URLS WITH UNFAMILIAR CONTENT

BACKGROUND

The present disclosure relates generally to the field of web content browsing, and more particularly to providing reading insight and notification on a uniform resource locator (URL) with unfamiliar content for a user.

A purpose of a web browser may be to fetch information resources from the Internet and display them on a user's device. The fetching process may begin when the user inputs a URL into the browser. Once a web page has been retrieved, the browser's rendering engine may display it on the user's device. A web page may contain a hyperlink to another page or resource. Each link may contain a URL. When the link is clicked, the web browser may navigate to the new resource. Web content may include, among other things, text, images, sounds, videos, and animations.

SUMMARY

Aspects of an embodiment of the present disclosure disclose an approach for providing reading insight and notification on a URL with unfamiliar content for a user. A processor parses a web page to identify a URL. The URL references a subsequent web page. Prior to receiving a user interaction with the URL, a processor prefetches content of the subsequent web page. A processor determines a content domain of the prefetched content, the content domain being a summary of the prefetched content. A processor compares the content domain to a user profile, wherein the use profile is based, at least in part, on a browsing history of a user. A processor determines that the content domain is not in alignment to the user profile. A processor presents a notification to the user.

DETAILED DESCRIPTION

The present disclosure is directed to systems and methods for providing reading insight and notification on a URL with unfamiliar content for a user.

The web industry has evolved in a multitude of ways on the maturity spectrum to the point that when a user points a browser to a URL, the expectation and trust are aligned such the content from the URL would match the URL name. Some web content on the Internet may not be appropriate for some users. Some web content may not be familiar or interesting to some users. For example, when a user makes a typo on the URL, the browser may display inappropriate or unfamiliar content to the user. In another situation, a user may discover the content behind a link is unfamiliar or irrelevant when a user clicks on the link of the URL. Embodiments of the present disclosure recognize a need to know a content domain from the URL before the user clicks the URL with potentially unfamiliar or irrelevant content.

In one or more embodiments, the present disclosure discloses methods and systems allowing user's visibility to a content domain prior to clicking a URL link to fetch the content. For example, the methods and systems may allow the user to assess whether the content from the URL is something that the user may not prefer to read, or a new domain that may or may not be of interest to the user. The present disclosure discloses intercepting a user's action of proceeding with the URL, analyzing the content and displaying a hint on the browser for the URL that may contain an unfamiliar content domain outside the user's reading interest.

An embodiment of the present disclosure discloses presenting the user an alert or warning prior to clicking any linked content that may not be within the content domain that the user usually reads about. The unfamiliar content domain may include domains or topics that the user either does not prefer to read about or has not read before. If the user clicks on a URL that may lead to content that is outside of the user's usual reading domain, the URL can change a color as a warning. An embodiment of the present disclosure may learn the user's reading behavior, accurately classify URL links or thumbnail images based on individual user's established behavior, interests/preferences, and browsing history. The reading content of the user can be gathered through, for example, the browsing history and the visited content in social media by the user. The content of these materials can be captured and analyzed to determine the content domain or specific topics within the domain that the user is interested in or the user would usually read about. An embodiment of the present disclosure may build a user profile based on, for example, the user's browsing history and reading interest. A user can disable this feature or have to opt in to have their information be obtained. The user is in control of what type of information is going to be collected and aware of how that information is going to be used.

Figure 1:
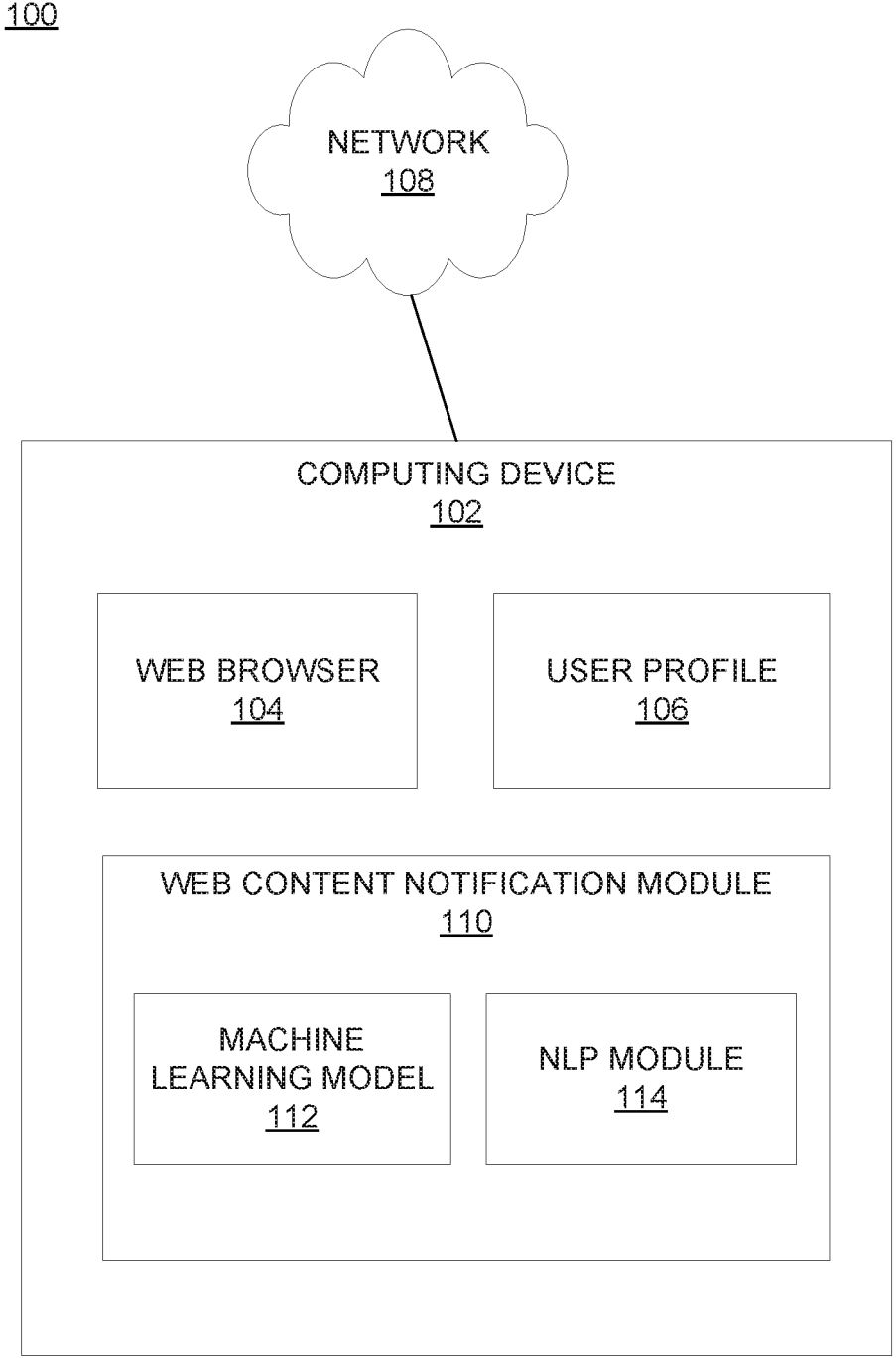
FIG. 1 is a functional block diagram illustrating a web content notification environment, in accordance with an embodiment of the present disclosure.

The present disclosure will now be described in detail with reference to the Figures. FIG. 1 is a functional block diagram illustrating web content notification environment, generally designated 100, in accordance with an embodiment of the present disclosure.

In the depicted embodiment, web content notification environment 100 includes computing device 102 and network 108.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to web content notification module 110 and network 108 and is capable of processing program instructions and executing web content notification module 110, in accordance with an embodiment of the present disclosure. Computing device 102 may include internal and external hardware components, as depicted and described in further detail with respect to FIG. 4.

Further, in the depicted embodiment, computing device 102 includes web browser 104, user profile 106, and web content notification module 110. Web browser 104 is a software application for accessing information on the world wide web, for example, through network 108. When a user requests a particular website, web browser 104 may retrieve the necessary content from a web server and display the resulting web page on computing device 102. Web browser 104 may record and save a browsing history for the user. The browsing history may be a list of web pages that the user has visited, as well as the associated data such as page title and time of visit.

User profile 106 includes a contain domain that a user is interested in or would usually read about from web browser 104. The user can disable this feature or have to opt in to have their information be obtained. The user is in control of what type of information is going to be collected and aware of how that information is going to be used. User profile 106 may include the browsing history of the user in web browser 104. User profile 106 may be based on a reading interest of the user. User profile 106 may be updated in response to the user interaction to a URL. User profile 106 may be updated after a confirmation from the user in response to the user interaction to a URL. User profile 106 may include information of the user's established behavior, interests and preferences on a reading content for the user. The reading content of the user can be gathered through, for example, the browsing history of the user on web browser 104, and the visited content in social media via the user. The reading content can be captured and analyzed to determine the content domain or specific topics within the domain that the user is interested in or the user would usually read about.

In the depicted embodiment, web content notification module 110 is located on computing device 102. However, in other embodiments, web content notification module 110 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and web content notification module 110, in accordance with a desired embodiment of the disclosure.

In the depicted embodiment, web content notification module 110 includes machine learning model 112 and natural language processing (NLP) module 114. In the depicted embodiment, machine learning model 112 and NLP module 114 are located on web content notification module 110 and computing device 102. However, in other embodiments, machine learning model 112 and natural language processing (NLP) module 114 may be located externally and accessed through a communication network such as network 108.

In one or more embodiments, machine learning model 112 includes a wide variety of algorithms and methodologies that may be used by computer device 102 and web content notification module 110. Machine learning model 112 may be trained under supervision, by learning from examples and feedback, or in unsupervised mode. Machine learning model 112 may include neural networks, deep learning, support vector machines, decision trees, self-organizing maps, case-based reasoning, instance-based learning, hidden Markov models, and regression techniques. In another example, machine learning model 112 is a deep learning model that employs a multi-layer hierarchical neural network architecture and an end-to-end approach to training where machine learning model 112 is trained by a set of input data and desired output with learning happening in the intermediate layers. Machine learning model 112 may learn to adjust weights of the interconnections in the training process. In one example, machine learning model 112 may be trained to generate user profile 106. User profile 106 may be based on a reading interest of the user. User profile 106 may be updated in response to the user interaction to a URL. User profile 106 may include the browsing history of the user. User profile 106 may include information of the user's established behavior, interests and preferences on a reading content for the user.

In one or more embodiments, NLP module 114 is a module of augmented intelligence or artificial intelligence concerned with analyzing, understanding, and generating natural human languages. NLP module 114 may be used by web content notification module 110 to analyze and understand texts, languages and information from a user, web browser 104, user profile 106, and network 108.

In one or more embodiments, web content notification module 110 is configured to parse a web page to identify a URL. The URL may reference another web page. In an example, when a user enters a URL manually on web browser 104, web content notification module 110 may identify the entered URL once the user completes typing. In another example, web content notification module 110 may parse a current web page to identify a URL when the URL is a link shown on the current web page of web browser 104. The URL may reference another web page. In yet another example, when a link of a URL is shown as a small image or thumbnail on the current web page, web content notification module 110 may parse the current web page to identify the URL.

In one or more embodiments, web content notification module 110 is configured to prefetch content of the web page referenced by the URL. Web content notification module 110 may prefetch the content prior to receiving a user interaction of a user with the URL. For example, web content notification module 110 may prefetch the content prior to clicking the URL of the user. Web content notification module 110 may allow user's visibility to a content insight to a user prior to clicking a URL link to fetch the content. For example, web content notification module 110 may allow the user to assess whether the content from the URL is something that the user may not prefer to read, or a new domain that may or may not be of interest to the user.

In one or more embodiments, web content notification module 110 is configured to determine a content domain of the prefetched content. In an example, the content domain may be a summary of the prefetched content. Web content notification module 110 may analyze and understand the prefetched content via NLP module 114. Web content notification module 110 may summarize the prefetched content with keywords. Web content notification module 110 may classify the prefetched content into the content domain based on the summarized keywords via machine learning model 112. In another example, web content notification module may divide the prefetched content into paragraphs. Web content notification module 110 may analyze the content of each paragraph and summarize the content with keywords. Web content notification module 110 may know the content domain from the URL before a user clicks the URL with potentially unfamiliar or irrelevant content.

In one or more embodiments, web content notification module 110 is configured to compare the content domain to user profile 106 based, at least in part, on a browsing history of a user on web browser 104. In an example, web content notification module 110 may compare the content domain to user profile 106 via machine learning model 112. Web content notification module 110 may determine whether the content domain is in alignment with user profile 106 or not. For example, web content notification module 110 may determine that the content domain is not in alignment with user profile 106 when the content domain is unfamiliar or inappropriate to the user.

In one or more embodiments, web content notification module 110 is configured to, in response to determining that the content domain is unfamiliar to the user, present a notification to a user. Web content notification module 110 may present the notification to the user by changing a color on the URI. For example, web content notification module 110 may change the color to red when the content may be inappropriate. Web content notification module 110 may change the color to yellow when the content may be a controversial material. Web content notification module 110 may change the color to purple when the content domain is a new domain for the user. In another example, web content notification module 110 may update user profile 106 in response to the user interaction to a URL via machine learning model 112. For example, machine learning model 112 may learn the user's behavior and interest when the user determines whether to click the URL. The user may determine not to click the URL after learning the warning that the content domain of the URL is unfamiliar to the user. In another example, the user may determine to still click the URL after learning the warning that the content domain of the URL is unfamiliar to the user. Machine learning model 112 may learn the user interaction accordingly and update user profile 106.

Figure 2:
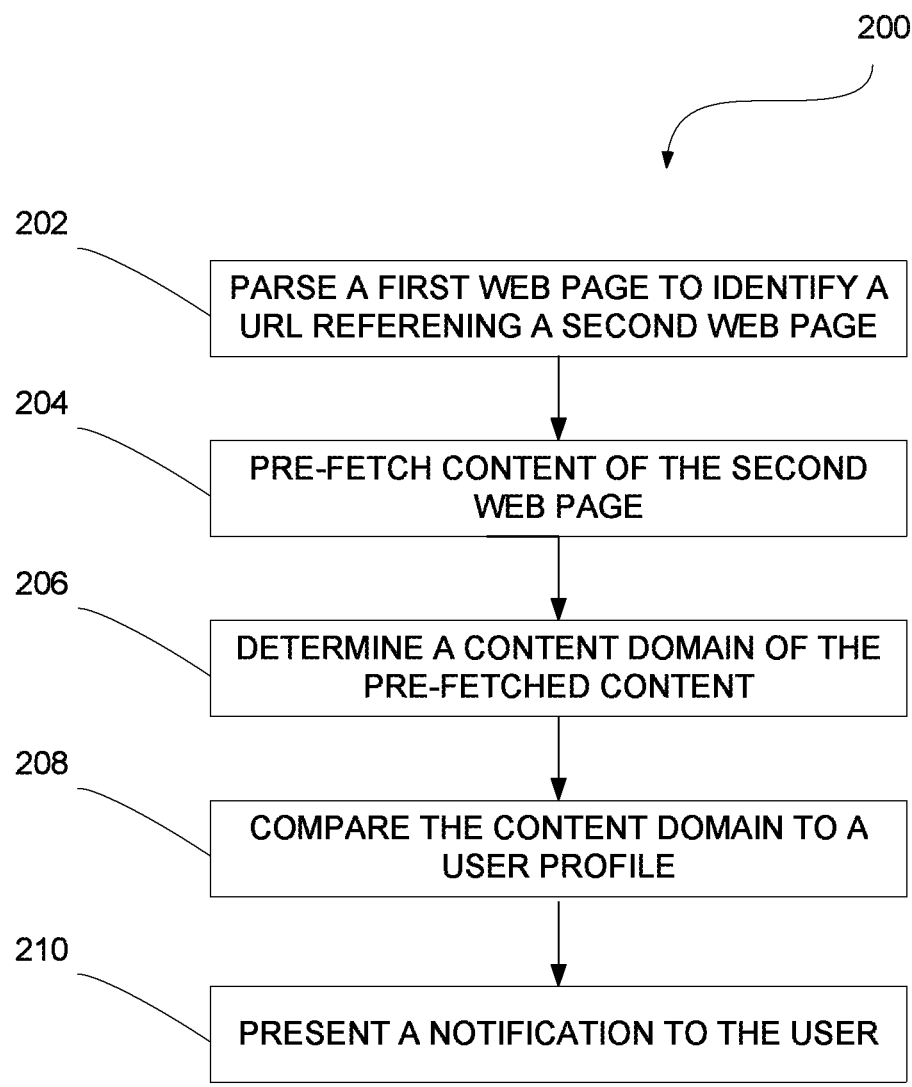
FIG. 2 is a flowchart depicting operational steps of a web content notification module within a computing device of FIG. 1, in accordance with an embodiment of the present disclosure.

FIG. 2 is a flowchart 200 depicting operational steps of web content notification module 110 in accordance with an embodiment of the present disclosure.

Web content notification module 110 operates to parse a web page to identify a URL. The URL references a subsequent web page. Prior to receiving a user interaction of the user with the URL, web content notification module 110 operates to prefetch content of the subsequent web page. Web content notification module 110 operates to determine a content domain of the prefetched content. Web content notification module 110 operates to compare the content domain to user profile 106 based, at least in part, on a browsing history of the user. In response to determining that the content domain is unfamiliar to the user, web content notification module 110 operates to present a notification to the user.

In step 202, web content notification module 110 parses a web page to identify a URL. The URL references a subsequent web page. In an example, when the user enters a URL manually on web browser 104, web content notification module 110 may identify the entered URL once the user completes typing. In another example, web content notification module 110 may parse a current web page to identify a URL when the URL is a link on the current web page of web browser 104. The URL may reference another web page. In yet another example, when a link of a URL is shown as a small image or thumbnail on the current web page, web content notification module 110 may parse the current web page to identify the URL.

In step 204, web content notification module 110 prefetches content of the subsequent web page linked by the URL. Web content notification module 110 may prefetch the content prior to receiving a user interaction of a user with the URL. Web content notification module 110 may prefetch the content prior to clicking the URL via a user. For example, when a user makes a typo on the URL, the browser may display inappropriate or unfamiliar content to the user. In another situation, a user may discover the content behind a link is unfamiliar or irrelevant when a user blindly clicks on the link of the URL. Web content notification module 110 may prefetch the content prior to clicking the URL via the user.

In step 206, web content notification module determines a content domain of the prefetched content. In an example, the content domain may be a summary of the prefetched content. Web content notification module 110 may analyze and understand the prefetched content via NLP module 114. Web content notification module 110 may summarize the prefetched content with keywords. Web content notification module 110 may classify the prefetched content into the content domain based on the summarized keywords via machine learning model 112. In another example, web content notification module 110 may divide the prefetched content into paragraphs. Web content notification module 110 may analyze the content of each paragraph and summarize the content with keywords. Web content notification module 110 may know the content domain from the URL before the user clicks the URL with a potential unfamiliar or irrelevant content.

In step 208, web content notification module 110 compares the content domain to user profile 106. In an example, user profile 106 may be based on a browsing history of the user. In another example, web content notification module 110 may compare the content domain to user profile 106 via machine learning model 112. Web content notification module 110 may determine whether the content domain is in alignment with user profile 106 or not. For example, web content notification module 110 may determine that the content domain is not in alignment with user profile 106 when the content domain is unfamiliar or inappropriate to the user. Content notification module 110 may compare keywords in the content domain to user profile 106 to determine whether the user is familiar or interested to the content of the URL.

In step 210, web content notification module 110 may present a notification to the user when web content notification module 110 determines that the content domain is unfamiliar to the user. Web content notification module 110 may present a notification to the user when web content notification module 110 determines that the content domain is inappropriate or controversial to the user. Web content notification module 110 may present the notification to the user by changing a color on the URI. For example, web content notification module 110 may change the color to red when the content may be inappropriate. Web content notification module 110 may change the color to yellow when the content may be a controversial material. Web content notification module 110 may change the color to purple when the content domain is a new domain for the user. These are just examples and any color may be used. Other notification methods are possible. For example, web content notification module 110 may present a notification by underlining, italicizing, and or changing the font or by other suitable methods.

Figure 3:
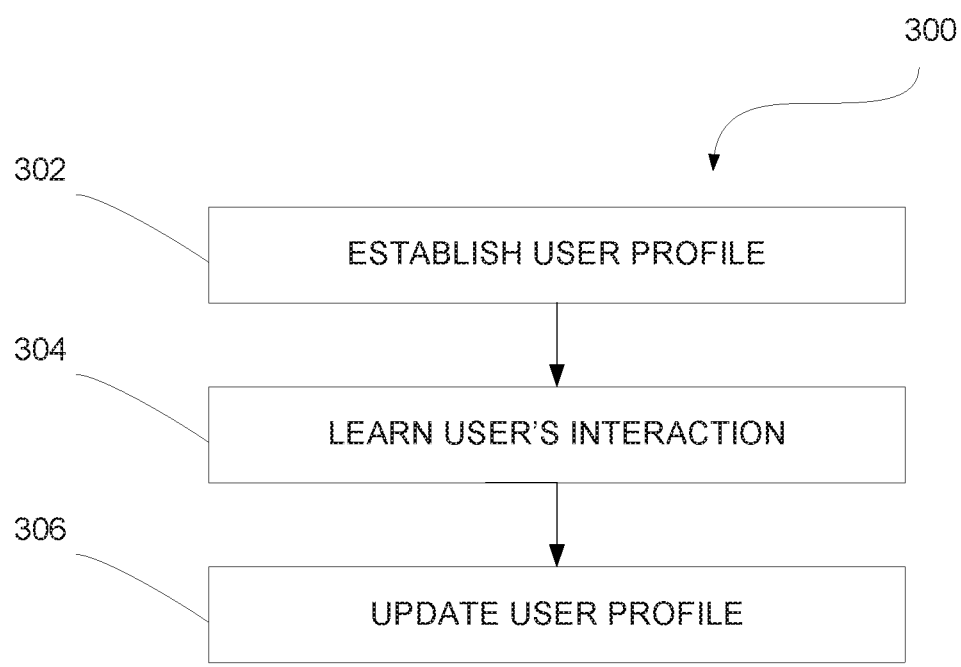
FIG. 3 is a flowchart depicting operational steps of a web content notification module within a computing device of FIG. 1, in accordance with an embodiment of the present disclosure.

FIG. 3 is a flowchart 300 depicting operational steps of web content notification module 110 in accordance with an embodiment of the present disclosure.

Web content notification module 110 operates to establish user profile 106. Web content notification module 110 also operates to learn user's behavior of reading interest and content. Web content notification module 110 operates to update user profile 106 based on the learning of user's behavior.

In step 302, web content notification module 110 establishes user profile 106 based on, for example, the browsing history of the user. User profile 106 may include a contain domain that the user is interested in or would usually read about from web browser 104. User profile 106 may include the browsing history of the user on web browser 104. User profile 106 may be based on a reading interest of the user. User profile 106 may include information of the user's established behavior, interests and preferences on a reading content for the user. The reading content of the user can be gathered through, for example, the browsing history of the user on web browser 104 and the visited content in social media via the user. The reading content can be captured and analyzed to determine the domain or specific topics within the domain that the user is interested in or the user would usually read about.

In step 304, web content notification module 110 learns the user's interaction through machine learning model 112. Web content notification module 110 learns the behavior of a user whether the user clicks on the linked content. If the user clicks on the URL with unfamiliar content, web content notification module 110 may ask the user whether to adjust user profile 106 for the user.

In step 306, web content notification module 110 updates user profile 106 in response to the user interaction to a URL via machine learning model 112. For example, machine learning model 112 may learn the user's behavior and interest when a user determines whether to click the URL. The user may determine not to click the URL after learning the warning that the content domain of the URL is unfamiliar to the user. In another example, the user may determine to still click the URL after learning the warning that the content domain of the URL is unfamiliar to the user. Machine learning model 112 may learn the user interaction accordingly and update user profile 106.

Figure 4:
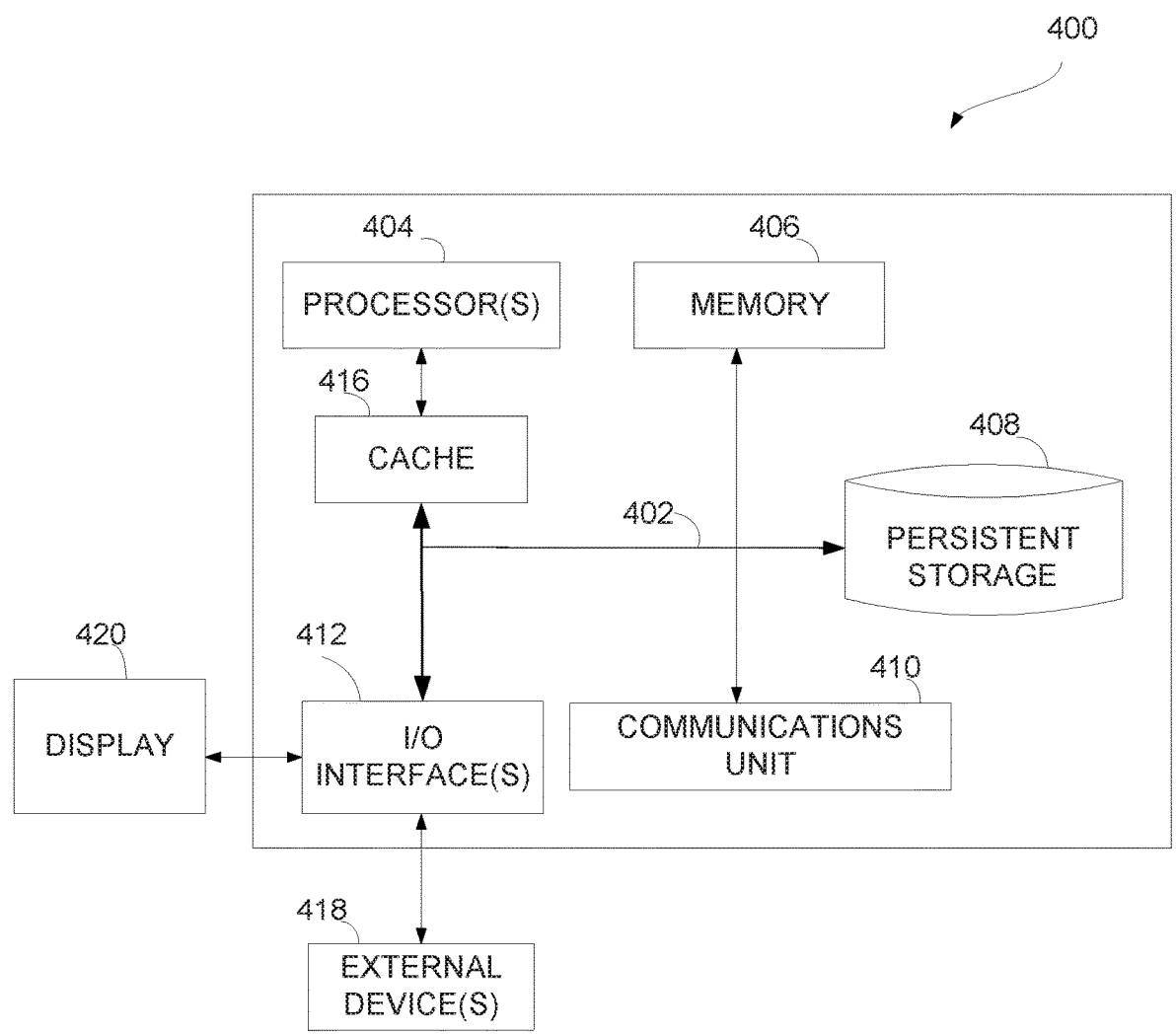
FIG. 4 is a block diagram of components of the computing device of FIG. 1, in accordance with an embodiment of the present disclosure.

FIG. 4 depicts a block diagram 400 of components of computing device 102 in accordance with an illustrative embodiment of the present disclosure. It should be appreciated that FIG. 4 provides only an illustration of one implementation and does not imply any limitations with regard to the environments in which different embodiments may be implemented. Many modifications to the depicted environment may be made.

Computing device 102 may include communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Web content notification module 110 may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Web content notification module 110 may be downloaded to persistent storage 408 through communications unit 410.

I/O interface(s) 412 allows for input and output of data with other devices that may be connected to computing device 102. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., web content notification module 110 can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
parsing, by one or more processors, a first web page to identify a uniform resource locator (URL), the URL referencing a second web page;
prior to receiving a user interaction with the URL, prefetching, by one or more processors, content of the second web page;
determining, by one or more processors, a content domain of the prefetched content, the content domain being a summary of the prefetched content;
dividing, by one or more processors, the prefetched content into paragraphs;
analyzing, by one or more processors, the prefetched content;
understanding, by one or more processors, the prefetched content via natural language processing techniques knowing the content domain from the URL before the user clicks the URL;
summarizing, by one or more processors, the prefetched content with keywords;
classifying, by one or more processors, the prefetched content into the content domain based on the summarized keywords;
establishing, by one or more processors, a user profile based on a browsing history of the user and visited content in social media via the user, wherein the user profile includes information of the user's established behavior, interests and preferences on a reading content for the user;
learning, by one or more processors, the user interaction with the URL, wherein learning the user interaction includes learning the behavior of the user whether the user clicks on a linked content with the URL;
updating, by one or more processors, the user profile based on the learned user interaction, wherein the user profile is updated in response to the user interaction to the URL;
comparing, by one or more processors, the content domain to the user profile, wherein the use profile is based, at least in part, on the browsing history of a user;
determining, by one or more processors, that the content domain is not in alignment to the user profile;
changing, by one or more processors, a color on the URL;
displaying, by one or more processors, a hint on the first web page for the URL that contains the prefetched content being an unfamiliar content domain outside the user's reading interest; and
presenting, by one or more processors, a notification to the user.

2. The computer-implemented method of claim 1, wherein the URL is manually entered on the first web page by the user.

3. A computer program product comprising:
one or more computer readable storage media, and program instructions collectively stored on the one or more computer readable storage media, the program instructions comprising:
program instructions to parse a first web page to identify a URL, the URL referencing a second web page;
program instructions to, prior to receiving a user interaction with the URL, prefetch content of the second web page;
program instructions to determine a content domain of the prefetched content, the content domain being a summary of the prefetched content;
program instructions to divide the prefetched content into paragraphs;
program instructions to analyze the prefetched content;
program instructions to understand the prefetched content via natural language processing techniques knowing the content domain from the URL before the user clicks the URL;
program instructions to summarize the prefetched content with keywords;
program instructions to classify the prefetched content into the content domain based on the summarized keywords;
program instructions to establish a user profile based on a browsing history of the user and visited content in social media via the user, wherein the user profile includes information of the user's established behavior, interests and preferences on a reading content for the user;
program instructions to learn the user interaction with the URL, wherein learning the user interaction includes learning the behavior of the user whether the user clicks on a linked content with the URL;
program instructions to update the user profile based on the learned user interaction, wherein the user profile is updated in response to the user interaction to the URL;
program instructions to compare the content domain to the user profile, wherein the use profile is based, at least in part, on the browsing history of a user;
program instructions to determine that the content domain is not in alignment to the user profile;
program instructions to change a color on the URL;
program instructions to display a hint on the first web page for the URL that contains the prefetched content being an unfamiliar content domain outside the user's reading interest; and
program instructions to present a notification to the user.

4. The computer program product of claim 3, wherein the URL is manually entered on the first web page by the user.

5. A computer system comprising:
one or more computer processors, one or more computer readable storage media, and program instructions stored on the one or more computer readable storage media for execution by at least one of the one or more computer processors, the program instructions comprising:
program instructions to parse a first web page to identify a URL, the URL referencing a second web page;
program instructions to, prior to receiving a user interaction with the URL, prefetch content of the second web page;
program instructions to determine a content domain of the prefetched content, the content domain being a summary of the prefetched content;
program instructions to divide the prefetched content into paragraphs;
program instructions to analyze the prefetched content;
program instructions to understand the prefetched content via natural language processing techniques knowing the content domain from the URL before the user clicks the URL;
program instructions to summarize the prefetched content with keywords;

program instructions to classify the prefetched content into the content domain based on the summarized keywords;
program instructions to establish a user profile based on a browsing history of the user and visited content in social media via the user, wherein the user profile includes information of the user's established behavior, interests and preferences on a reading content for the user;
program instructions to learn the user interaction with the URL, wherein learning the user interaction includes learning the behavior of the user whether the user clicks on a linked content with the URL;
program instructions to update the user profile based on the learned user interaction, wherein the user profile is updated in response to the user interaction to the URL;
program instructions to compare the content domain to the user profile, wherein the use profile is based, at least in part, on the browsing history of a user;
program instructions to determine that the content domain is not in alignment to the user profile;
program instructions to change a color on the URL;
program instructions to display a hint on the first web page for the URL that contains the prefetched content being an unfamiliar content domain outside the user's reading interest; and
program instructions to present a notification to the user.

6. The computer system of claim 5, wherein the URL is manually entered on the first web page by the user.

* * * * *